(12) United States Patent
Koinuma et al.

(10) Patent No.: US 6,417,273 B1
(45) Date of Patent: Jul. 9, 2002

(54) MONOMER COMPOSITION FOR OPTICAL PLASTIC OPTICAL MATERIAL, OPTICAL PLASTIC MATERIAL, AND LENS

(75) Inventors: Yasumi Koinuma, Oita; Katsuyoshi Tanaka, Tokyo, both of (JP)

(73) Assignee: NOF Corporation, Tokyo (JP)

( * ) Notice: Subject to any disclaimer, the term of this patent is extended or adjusted under 35 U.S.C. 154(b) by 0 days.

(21) Appl. No.: 09/744,368

(22) PCT Filed: May 29, 2000

(86) PCT No.: PCT/JP00/03438

§ 371 (c)(1),
(2), (4) Date: Jan. 23, 2001

(87) PCT Pub. No.: WO00/73365

PCT Pub. Date: Dec. 7, 2000

(30) Foreign Application Priority Data

| May 27, 1999 | (JP) | 11-147757 |
| Jun. 3, 1999 | (JP) | 11-156283 |
| Jun. 3, 1999 | (JP) | 11-156284 |
| Nov. 9, 1999 | (JP) | 11-317733 |

(51) Int. Cl.⁷ .......... C08L 75/04; C08L 75/14; C08L 75/16; C08L 81/00; G02B 1/04
(52) U.S. Cl. .......... 525/123; 522/142; 522/143; 522/144; 522/90; 522/95; 522/96; 522/173; 522/174; 522/180; 522/181; 522/182; 522/183; 525/127; 525/455; 525/457; 526/286; 526/288; 526/301; 351/159; 359/642
(58) Field of Search .......... 525/123, 127, 525/455, 457; 526/286, 288, 301; 522/142, 180, 173, 182, 90, 95, 96, 144, 143, 174, 181, 183; 351/159; 359/642

(56) References Cited

U.S. PATENT DOCUMENTS

| 4,256,669 A |   | 3/1981  | Benner et al. ........... 564/434 |
| 5,034,492 A | * | 7/1991  | Kawaki et al. ........... 528/75 |
| 5,384,380 A | * | 1/1995  | Kanesaki et al. ......... 526/292.9 |
| 5,475,074 A | * | 12/1995 | Matsuoka et al. ......... 526/336 |
| 5,908,876 A | * | 6/1999  | Fujii et al. ............. 522/142 |
| 6,019,915 A | * | 2/2000  | Fujii et al. ............. 264/1.36 |

FOREIGN PATENT DOCUMENTS

| JP | 55013747 A | 1/1980 |
| JP | 55-69543   | 5/1980 |
| JP | 62267316 A | 11/1987 |
| JP | 63023908 A | 2/1988 |
| JP | 02022601 A | 1/1990 |
| JP | 05287050   | 11/1993 |
| JP | 08198932   | 8/1996 |
| JP | 08198934   | 8/1996 |
| JP | 09012663   | 1/1997 |
| JP | 10332901   | 12/1998 |

* cited by examiner

*Primary Examiner*—Rabon Sergent
(74) *Attorney, Agent, or Firm*—Synnestvedt & Lechner LLP

(57) ABSTRACT

A monomer composition which provides a plastic optical material having high refractive index and Abbe number, a low specific gravity and excellent physical properties, such as dyeing properties, heat resistance, impact resistance and the like. The composition comprises a di(meth)acrylate compound, divinylbenzene and/or divinylbiphenyl, a crosslinking-type isocyanate compound, a polythiol compound having two or more thiol groups, and a thiourethane bonding accelerating compound. The plastic optical material obtained by the reaction of the above composition with a radical polymerization initiator is used as a material for a lens.

8 Claims, No Drawings

MONOMER COMPOSITION FOR OPTICAL PLASTIC OPTICAL MATERIAL, OPTICAL PLASTIC MATERIAL, AND LENS

TECHNICAL FIELD

The present invention relates to a monomer composition which provides a plastic optical material having high refractive index and Abbe number, a low specific gravity and excellent physical properties, such as dyeing properties, heat resistance, impact resistance and the like, a plastic optical material and a lens.

BACKGROUND ART

In recent years, in the field of optical materials used for lenses and the like, the properties for reduced weight, safety, fashion and the like are being regarded as great importance, and the material is changing from the conventional inorganic glass to synthetic resins. As representative synthetic resin materials, polydiethylene glycol bisallyl carbonate (hereinafter, referred to simply as "PADC"), polymethyl methacrylate (hereinafter, referred to simply as "PMMA"), polycarbonate (hereinafter, referred to simply as "PC"), and the like are well known.

PADC and PMMA are more excellent than inorganic glass in respect of the low specific gravity, the impact resistance and the dyeing properties. However, the refractive index of each of PADC and PMMA is about 1.49, and the refractive index is lower than that of the general inorganic glass which is 1.52. Therefore, there has been a drawback in that, when the lens becomes stronger, the thickness of the lens becomes larger. In addition, in PC, the refractive index is as high as about 1.58, but the Abbe number is as low as 29. Further, PC is shaped by a melt molding method, and thus, PC had other problems about optical anisotropy, discoloration and the like.

For solving these problems, a plastic lens having a higher refractive index and a higher Abbe number is disclosed. For example, in Japanese Unexamined Patent Publication No. Sho 55-13747, a copolymer of dimethacrylate of a bisphenol A derivative and styrene is disclosed. In Japanese Unexamined Patent Publication No. Sho 55-69543, a polymer of dimethacrylate of a halogenated bisphenol A derivative is disclosed.

In Japanese Unexamined Patent Publication No. Sho 63-23908, for the purpose of further increasing the refractive index, a polymer of diallyl diphenate is disclosed. In Japanese Patent No. 2707613, a polymer comprising an isocyanate compound having an unsaturated group and polythiol is disclosed. In Japanese Unexamined Patent Publication No. Sho 62-267316, a thiourethane resin comprising polyisocyanate and polythiol is disclosed.

However, with respect to the copolymer disclosed in Japanese Unexamined Patent Publication No. Sho 55-13747, the refractive index is about 1.55 and was not satisfactory. With respect to the polymer disclosed in Japanese Unexamined Patent Publication No. Sho 55-69543, the refractive index is as high as about 1.60; however, the specific gravity was high due to halogenation, and the weathering resistance was poor.

Further, with respect to the polymer disclosed in Japanese Unexamined Patent Publication No. Sho 63-23908, the Abbe number was as low as about 29, and the impact resistance was poor. With respect to the polymer in Japanese Patent No. 2707613, the refractive index is about 1.58 and was not satisfactory, and the heat resistance also was poor.

The resin disclosed in Japanese Unexamined Patent Publication No. Sho 62-267316 had a high specific gravity and a poor heat resistance.

DISCLOSURE OF THE INVENTION

It is an object of the present invention to provide a monomer composition for a plastic optical material, a plastic optical material and a lens, which are excellent in respect of refractive index, Abbe number, specific gravity, heat resistance, dyeing properties and impact resistance.

For attaining the above object, the first embodiment of the present invention provides a monomer composition for a plastic optical material, which comprises: a di(meth)acrylate compound; at least one of divinylbenzene and divinylbiphenyl; a crosslinking-type isocyanate compound; a compound having two or more thiol groups; and a thiourethane bonding accelerating compound.

The second embodiment of the present invention provides a monomer composition for a plastic optical material, which comprises: a di(meth)acrylate compound; at least one of divinylbenzene and divinylbiphenyl; and a reaction product of a crosslinking-type isocyanate compound with a compound having two or more thiol groups.

The di(meth)acrylate is preferably represented by the following chemical formula (1):

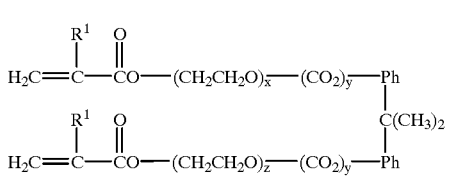

wherein $R^1$ represents a hydrogen atom or a methyl group, Ph represents a phenylene group, x and z may be the same or different and each represent an integer of 1 to 5, and y is 0 or 1.

The thiourethane bonding accelerating compound is preferably at least one compound selected from the group consisting of an amine compound, an amine salt compound and an organometallic compound.

The third embodiment of the present invention provides a plastic optical material obtained by curing a mixture of the above-mentioned monomer composition and a radical polymerization initiator.

The fourth embodiment of the present invention provides a lens produced from the above-mentioned plastic optical material.

The above lens preferably has a hard coat layer on a surface thereof.

BEST MODE FOR CARRYING OUT THE INVENTION

The monomer composition for a plastic optical material of the present embodiment comprises, as essential components, the following components: a di(meth)acrylate compound, divinylbenzene and/or divinylbiphenyl (hereinafter, referred to as "divinylphenyl compound"), a crosslinking-type isocyanate compound, and a compound having two or more thiol groups (hereinafter, referred to as "polythiol compound"). And, a thiourethane bonding accelerating compound can be further added.

The di(meth)acrylate compound means a compound having two (meth)acryloyloxy groups per molecule. Specific examples include ethylene glycol di(meth)acrylate, diethylene glycol di(meth)acrylate, polyethylene glycol di(meth)acrylate, propylene di(meth)acrylate and polypropylene glycol di(meth)acrylate. In the present specification, the term "di(meth)acrylate" means dimethacrylate and diacrylate. From the viewpoint of improving the refractive index of the plastic optical material, di(meth)acrylate represented by chemical formula (1) is preferably used.

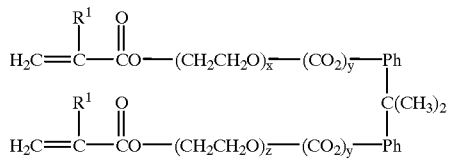

(1)

In chemical formula (1), $R^1$ represents a hydrogen atom or a methyl group, y is 0 or 1, and x and z may be the same or different and each represent an integer of 1 to 5, preferably integer of 1 to 3. When x and/or z is 6 or more, the refractive index and the heat resistance of the resultant resin become considerably low.

As di(meth)acrylate represented by chemical formula (1), for example, there can be mentioned 2,2-bis(4-methacryloxyethoxyphenyl)propane, 2,2-bis[4-( 2-methacryloxyethoxy)ethoxy]propane, 2,2-bis[4-(2-methacryloxyethoxy)diethoxy]propane, 2,2-bis[4-(2-methacryloxyethoxy)triethoxyphenyl]propane, 2,2-bis[4-(2-methacryloxyethoxy)tetraethoxyphenyl]propane, 2,2-bis[4-(2-methacryloxyethoxycarbonyloxy)phenyl]propane, and 2,2-bis{4-[(2-methacryloxyethoxy)ethoxycarbonyloxy]phenyl} propane. Di(meth)acrylate can be used singly or in combination. The content of the di(meth)acrylate in the monomer composition is generally 5 to 50% by weight, preferably in the range of from 15 to 45% by weight. When the content is less than 5% by weight, the effect of imparting impact resistance and dyeing properties to the optical material cannot be satisfactorily obtained, and, when the content exceeds 50% by weight, the refractive index of the resultant optical material tends to lower.

The divinylphenyl compound includes divinylbenzene and divinylbiphenyl. The content of the divinylphenyl compound in the monomer composition is generally 5 to 40% by weight, preferably 7 to 30% by weight. When the content is less than 5% by weight, the effect of improving the refractive index of the optical material and imparting heat resistance to the optical material cannot be satisfactorily obtained, and, when the content exceeds 40% by weight, the impact resistance of the resultant optical material tends to lower. The divinylphenyl compounds can be used singly or in combination.

The crosslinking-type isocyanate compound includes a crosslinking-type monoisocyanate compound having both of a vinyl group and an isocyanate group, a diisocyanate compound, and a compound having one isocyanate group and two or more vinyl groups or isocyanate groups. As specific examples, crosslinking-type monoisocyanate compounds, such as 3-isopropenyl-α,α-dimethylbenzyl isocyanate, isocyanatoethyl methacrylate and the like, can be used. Further, diisocyanate compounds, such as hexamethylene diisocyanate, 4,4'-dicyclohexylmethane diisocyanate, m-xylene diisocyanate, m-tetramethylxylene diisocyanate, isophorone diisocyanate and the like, can be used. Of these, preferred is a compound which is in the form of liquid at room temperature and suffers no discoloration after curing. The above-mentioned compounds can be used singly or in combination. The content of the crosslinking-type isocyanate compound in the monomer composition is generally 10 to 50% by weight, preferably 20 to 40% by weight. When the content is less than 10% by weight, the effect of improving the refractive index of the optical material and controlling the vigorous polymerization reaction cannot be satisfactorily obtained, and, when the content exceeds 50% by weight, a curing failure of the optical material tends to occur.

As the polythiol compounds, for example, there can be mentioned dithiol, such as ethanedithiol, 1,4-butanedithiol, 1,6-hexanedithiol, 3,3'-dithiodipropionic acid, ethylene glycol dithioglycolate, 2,2'-thiodiethanethiol, 2,2'-oxyethanethiol, dimercaptotriethylene disulfide, 1,2-dithioglycerol, 1,3-dithioglycerol, 1,4-benzenedithiol, 1,2-benzenedithiol, 1,3-benzenedithiol, 1,2-bis(mercaptomethylene)benzene, 1,3-bis(mercaptomethylene)benzene, 1,4-bis(mercaptomethylene)benzene, or the like, and polythiol, such as pentaerythritol tetrakis(thioglycolate), trimethylolpropane tris(β-mercaptopropionate), or the like. These polythiol compounds can be used singly or in combination. In addition, the content of the polythiol compound in the monomer composition is generally 10 to 40% by weight, preferably 15 to 30% by weight. When the content is less than 10% by weight, the compound is reacted with the isocyanate compound to form a urethane linkage, so that the effect of improving the refractive index of the optical material cannot be satisfactorily obtained, and, when the content exceeds 40% by weight, a curing failure of the optical material tends to occur and the weathering resistance tends to lower.

The thiourethane bonding accelerating compound is used for accelerating the addition polymerization reaction of the crosslinking-type isocyanate compound and the polythiol compound. Specifically, for example, amine compounds, such as tetramethylbutanediamine, triethylenediamine, triethyleneamine, pyridine, 1,8-diazabicyclo[5.4.0] undecene-7, N,N-diethylaminoethyl (meth)acrylate and the like, amine salt compounds, such as triethylenediamine salt of (meth)acrylic acid, 1,8-diazabicyclo[5.4.0] undecene-7 salt of (meth)acrylic acid, and the like, and organometallic compounds, such as dibutyltin diphthalate, dibutyltin dilaurate, dimethyltin dichloride, lead octanoate and the like, can be used. Preferred are triethylenediamine, 1,8-diazabicyclo[5.4.0] undecene-7, 1,8-diazabicyclo[5.4.0] undecene-7 salt and dibutyltin dilaurate. These thiourethane bonding accelerating compounds can be used singly or in combination.

The amount of the thiourethane bonding accelerating compound added is generally 1 to 1000 ppm, preferably in the range of from 10 to 300 ppm, relative to the monomer composition. When the amount is less than 1 ppm, the curing is unsatisfactory, and, when the amount exceeds 1000 ppm, the cured optical material tends to suffer strain.

Further, the monomer composition of the present invention may comprise, as essential components, the above-mentioned di(meth)acrylate and divinylphenyl compound, and a reaction product of the crosslinking-type isocyanate compound with the compound having two or more thiol groups.

This reaction product means one that is obtained by allowing a mixture, which contains the crosslinking-type isocyanate compound, the compound having two or more thiol groups and the above-mentioned thiourethane bonding accelerating compound, to undergo reaction. The amount of the thiourethane bonding accelerating compound added is in the range of from 1 to 500 ppm, preferably 5 to 300 ppm, relative to the reaction composition. The reaction is conducted in the range of from room temperature to 80° C. for 10 minutes to 3 hours, preferably 15 minutes to 2 hours. The content of the reaction product in the monomer composition is generally 20 to 70% by weight, preferably 30 to 65% by weight. When the content is less than 20% by weight, the effect of improving the refractive index of the optical material cannot be satisfactorily obtained, and, when the content exceeds 70% by weight, a curing failure of the optical material tends to occur and the heat resistance tends to lower.

The content of the above-mentioned di(meth)acrylate in the monomer composition containing the reaction product of the crosslinking-type isocyanate compound with the compound having two or more thiol groups is 10 to 50% by weight, preferably 15 to 45% by weight. When the content is less than 10% by weight, the effect of imparting impact resistance and dyeing properties to the optical material cannot be satisfactorily obtained, and, when the content exceeds 50% by weight, the refractive index of the optical material tends to lower. Further, the content of the divinylphenyl compound in the monomer composition containing the above-mentioned reaction product is generally 5 to 30% by weight, preferably 7 to 25% by weight. When the content is less than 5% by weight, the effect of improving the refractive index of the optical material and imparting heat resistance to the optical material cannot be satisfactorily obtained, and, when the content exceeds 30% by weight, the impact resistance of the optical material tends to lower.

It has been confirmed that an intermediate compound represented by chemical formula (2) is formed in the polymerization reaction using the thiourethane bonding accelerating compound and a radical polymerization initiator.

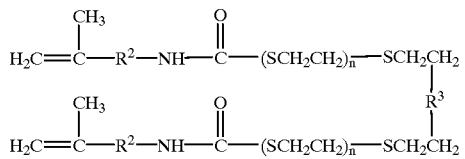

(2)

In the above formula, $R^2$ represents a —Ph—C(CH$_3$)$_2$— group or a —CO$_2$CH$_2$CH$_2$— group, $R^3$ represents a Ph group or a —Ph—Ph— group, and n represents an integer of 1 to 4 (wherein Ph represents a phenylene group). The intermediate compounds represented by chemical formula (2) include, for example, the following compounds:

[CH$_2$=C(CH$_3$)—Ph—C(CH$_3$)$_2$—NH—CO—S(CH$_2$)$_2$S(CH$_2$)$_2$—]$_2$Ph

[CH$_2$=C(CH$_3$)—Ph—C(CH$_3$)$_2$—NH—CO—S(CH$_2$)$_2$S(CH$_2$)$_2$S(CH$_2$)$_2$—]$_2$Ph

[CH$_2$=C(CH$_3$)—Ph—C(CH$_3$)$_2$—NH—CO—S(CH$_2$)$_2$S(CH$_2$)$_2$S(CH$_2$)$_2$—]$_2$(Ph)$_2$

[CH$_2$=C(CH$_3$)—Ph—C(CH$_3$)$_2$—NH—CO—S(CH$_2$)$_2$S(CH$_2$)$_2$S(CH$_2$)$_2$S(CH$_2$)$_2$—]$_2$Ph

[CH$_2$=C(CH$_3$)—CO$_2$CH$_2$CH$_2$—NH—CO—S(CH$_2$)$_2$S(CH$_2$)$_2$—]$_2$Ph

[CH$_2$=C(CH$_3$)—CO$_2$CH$_2$CH$_2$—NH—CO—S(CH$_2$)$_2$S(CH$_2$)$_2$S(CH$_2$)$_2$—]$_2$Ph

[CH$_2$=C(CH$_3$)—CO$_2$CH$_2$CH$_2$—NH—CO—S(CH$_2$)$_2$S(CH$_2$)$_2$S(CH$_2$)$_2$—]$_2$(Ph)$_2$.

The monomer composition may further contain other copoylmerizable vinyl monomers. As other vinyl monomers, there can be mentioned styrene, halogen nucleus substituted styrene, methyl nucleus substituted styrene, α-methylstyrene, α-methylstyrene dimer, vinylnaphthalene, methyl (meth)acrylate, ethyl (meth)acrylate, 2-hydroxyethyl (meth)acrylate, various urethane poly(meth)acrylate, diallylphthalate, glyceloyl (meth)acrylate, (meth)acrylic acid, (meth)acrylic acid amide, N,N-dimethylacrylamide and the like. A single monomer or two or more monomers mixed are appropriately selected in accordance with the refractive index.

The plastic optical material of the present embodiment is obtained by adding to the above-mentioned monomer composition a radical polymerization initiator, and then, curing by a heating curing method or an active energy rays curing method.

The radical polymerization initiator is used for curing the vinyl monomers, and for example, there can be mentioned benzoyl peroxide, lauroyl peroxide, diisopropyl dicarbonate, t-butylperoxy-2-ethyl hexanoate, t-butyl peroxypivalate, t-butyl peroxyneodecanoate, t-peroxydiisobutyrate, azobisisobutyronitrile, azobisdimethylvaleronitrile and the like. These can be used singly or in combination.

The amount of the polymerization initiator added is generally 0.01 to 10% by weight, preferably 0.1 to 5% by weight, based on the weight of the monomer composition. When the amount is less than 0.01% by weight, the curing is unsatisfactory, and, when the amount exceeds 10% by weight, the cured optical material tends to suffer strain.

In addition, to the monomer composition of the present invention can be further added an additive, such as an ultraviolet absorber, a photochromic dye, a coloring agent, a releasing agent, a surfactant, an antioxidant, an anti-fungus agent or the like, in the range of the amount generally used.

The plastic optical material and lens of the present invention are produced as follows.

First, a radical polymerization initiator is added to the monomer composition. The resultant mixture is charged into a mold having a desired lens shape, made of metal, glass, plastic or the like, followed by heating. This heating causes the monomer composition to undergo polymerization and be cured, to thereby form a crosslinked resin mass (plastic optical material) which is colorless and transparent, and insoluble in a solvent. Then, the resin mass is removed from the mold, to thereby obtain a lens which is colorless and transparent, and insoluble in a solvent.

The polymerization is conducted in the range of from 30 to 100° C. for 5 to 72 hours, preferably 10 to 36 hours. The polymerization temperature may be gradually increased in the range of from 30 to 100° C.

It is desired that the lens removed from the mold is subjected to annealing treatment in an atmosphere of nitrogen or air at 80 to 120° C. for 1 to 5 hours.

Further, as another method, the monomer composition is cured without using a mold, and the resultant plastic optical material mass can be processed by cutting into a desired lens shape, to thereby obtain a lens.

The lens of the present invention can be provided with a hard coat layer on a surface thereof for improving the resistance to scuffing of the surface. As the hard coat agent, for example, preferred is a coating composition comprised mainly of at least one of silane compounds having a functional group, such as an epoxy group, an alkoxy group, a vinyl group or the like, and at least one of colloids of metal oxides, such as silicon oxide, titanium oxide, antimony oxide, tin oxide, tungsten oxide, aluminum oxide and the like. The coating composition is applied onto the surface of the lens by the known application method, such as a dipping method, a spin coating method or the like, and cured by heating or UV irradiation, to thereby form a hard coat layer. The thickness of the hard coat layer is about 0.5 to 10 μm.

In addition, for the purpose of improving the adherence of the hard coat layer to the lens and the impact resistance of the lens, a primer layer can also be formed between the hard coat layer and the lens. A reflection preventing layer can also be formed on the surface of the hard coat layer. The reflection preventing layer is formed by vacuum deposition or sputtering of a metal oxide or a metal fluoride, such as silicon oxide, magnesium fluoride, aluminum oxide, zirconium oxide, titanium oxide, tantalum oxide, yttrium oxide or the like.

The lens of the present embodiment can also be subjected to coloring treatment by a disperse dye or a photochromic dye for imparting fashion properties to the lens if desired.

The plastic optical material of the present embodiment has excellent optical characteristics such that the refractive index is 1.55 or higher and the Abbe number is 30 or higher, and has a specific gravity as low as 1.3 or less and is excellent in respect of various physical properties required for the lens, such as dyeing properties, heat resistance, impact resistance and the like. Further, the lens of the present invention is thin and has an optical homogeneity.

EXAMPLES

Hereinbelow, the present invention will be described in more detail with reference to Examples and Comparative Examples, which should not be construed as limiting the scope of the present invention.

The formulations in Examples 1 to 23 and Comparative Examples 1 to 9 are shown in Tables 1 to 4. The abbreviations in the tables indicate the names of the following compounds.

BPE-2E: 2,2-Bis(4-methacryloxyethoxyphenyl)propane
BPE-4E: 2,2-Bis[4-(2-methacryloxyethoxy)ethoxy]propane
BPE-6E: 2,2-Bis[4-(2-methacryloxyethoxy)diethoxy]propane
ABPE-4: 2,2-Bis[4-(2-acryloxyethoxy)ethoxy]propane
HE-BP: 2,2-Bis[4-(2-methacryloxyethoxycarbonyloxy)phenyl]propane
DVB: Divinylbenzene
DVBP: Divinylbiphenyl
TMI: 3-Isopropenyl-α,α-dimethylbenzyl isocyanate
mTMDI: Tetramethylxylylene diisocyanate
XDI: m-Xylylene diisocyanate
EDT: Ethanedithiol
ETT: 2,2'-Thiodiethanethiol
ETRT: Dimercaptotriethylene disulfide
ST: Styrene
BzMA: Benzyl methacrylate
VN: 1-Vinylnaphthalene
PETT: Pentaerythritol tetrakis(β-thiopropionate)

Examples 1 to 8

The formulations of the raw material mixtures in Examples are shown in Table 1. To 20 g of a raw material mixture were added 100 ppm of 1,8-diazabicyclo[5.4.0]undecene-7 as a thiourethane bonding accelerating compound and 0.4 g of t-butyl peroxyneodecanoate as a polymerization initiator, followed by stirring, to thereby obtain a monomer composition.

The composition was charged into a mold comprised of two circular plates made of glass having a diameter of 7 cm and a gasket made of an ethylene-propylene rubber having a thickness of 2 mm. Then, the temperature of the mold was elevated in a hot air thermostatic chamber provided with a programmed temperature controller from 30° C. to 100° C. over 18 hours. Subsequently, the mold was maintained at 100° C. for 2 hours. Then, the mold was cooled to 40° C. over 2 hours. Thus, the composition in the mold was cured, and removed from the mold, to thereby obtain a resin mass in a disc shape. Further, the resin mass was subjected to annealing treatment at 100° C. for 2 hours, to thereby obtain a cured resin plate.

Evaluation Tests

The properties of the obtained resin plate were evaluated by the following test methods. The results are shown in Table 1.

(1) Light Beam Transmittance

Using a transmittance photometer manufactured by Nippon Denshoku Industries Co., Ltd., a light beam transmittance was measured in accordance with JIS (Japan Industrial Standards) K7105.

(2) Refractive Index and Abbe Number

With respect to the test piece of 1 cm×1.5 cm cut out from the resin plate, a measurement was conducted at 25° C. using an Abbe refractometer manufactured by ATAGO CO., LTD.

(3) Specific Gravity

A specific gravity (g/cm$^3$) of a test piece was measured at 25° C. by an underwater replacement method in accordance with JIS K7112.

(4) Impact Resistance

A ball made of steel having a weight of 16 g was allowed to undergo free fall from a height of 127 cm onto the resin plate, and then, the breakage degree of the ball was examined. Symbol ○ indicates no breakage, and symbol×indicates occurrence of breakage.

(5) Heat Resistance

With respect to the test piece of 1 cm×4 cm cut out from the resin plate, a dynamic viscoelasticity was measured using Rheovibron (trade name) manufactured by Toyo-Boldwin Co., Ltd. The temperature at which the tan δ was maximal, corresponding to a glass transition temperature (Tg), was used as an index for heat resistance.

(6) Dyeing Properties

A test piece was dipped in a brown dye bath at 92° C. for 10 minutes, and a light beam transmittance after dyeing was measured by a transmittance photometer manufactured by Nippon Denshoku Industries Co., Ltd.

Examples 9 to 16

The procedure was substantially the same as in Examples 1 to 8 except that to 20 g of a raw material mixture having the formulation shown in Table 2 were added 200 ppm of dibutyltin dilaurate and 0.4 g of t-butyl peroxyneodecanoate. The properties are shown in Table 2.

Examples 17 to 23

Into a 100 ml four-necked flask equipped with a thermometer, a dropping funnel and a stirrer were charged 0.2 mol of ethanedithiol as a polythiol compound and 100 ppm of 1,8-diazabicyclo[5.4.0]undecene-7 as a thiourethane bonding accelerating compound. The resultant mixture was stirred and maintained at 20° C. While stirring, 3-isopropenyl-α,α-dimethylbenzyl isocyanate as a crosslinking-type isocyanate contained in the dropping funnel was added dropwise over 1 hour, to thereby effect a reaction. After completion of the reaction, toluene was removed from the reaction liquid by vacuum distillation. From the infrared absorption spectrum analysis of the thus obtained compound, the presence of the absorption ascribed to a urethane linkage and the disappearance of the absorption ascribed to an isocyanate linkage were confirmed. From this fact, it has been confirmed that the obtained compound is the intended compound TM-2S.

3-Isopropenyl-α,α-dimethylbenzyl isocyanate and 2,2-thiodiethanethiol, and isocyanatoethyl methacrylate and 2,2'-thiodiethanethiol were respectively reacted with each other in the same manner, to thereby obtain compounds TM-3S and KM-3S.

The properties and the formulations of raw material mixtures in Examples 17 to 23 are shown in Table 3. In Examples 17 to 23, the procedure was substantially the same as in Examples 1 to 8 except that to 20 g of a raw material mixture in Table 3 was added 0.4 g of t-butyl peroxyneodecanoate.

Comparative Examples 1 to 9

As Comparative Examples 1 to 4, using commercially available 2 mm plates made of ADC, PMMA and PC and urethane resin lens (raw material: MR-6), the physical properties were examined in the same manner as in Examples 1 to 8.

As Comparative Example 5, a test piece was prepared from a mixture of 14 g of diallyl diphenate (DADP), 6 g of diallyl isophthalate (DAIP) and 0.6 g of isopropyl peroxycarbonate in the same manner as in Examples 1 to 8, and with respect to the prepared test piece, the physical properties were examined.

As Comparative Examples 6 to 9, as shown in Table 4, to 20 g of a raw material mixture containing TMI was added 0.4 g of t-butyl peroxyneodecanoate, and test pieces were prepared in the same manner as in Examples 1 to 8, and with respect to each of the prepared test pieces, the physical properties were examined. The results are shown in Table 4.

TABLE 1

| Example | | 1 | 2 | 3 | 4 | 5 | 6 | 7 | 8 |
|---|---|---|---|---|---|---|---|---|---|
| Raw Material (g) | BPE-2E | 7.0 | | | | | | 7.0 | 5.0 |
| | BPE-4E | | 5.0 | | | 1.0 | 9.0 | | |
| | ABPE-4 | | | | 3.5 | | | | |
| | BPE-6E | | | 4.0 | | | | | |
| | HE-BP | | | | | 1.5 | | | |
| | DVB | 2.5 | 2.5 | | 3.5 | | 1.5 | 4.2 | 4.2 |
| | DVBP | | | 3.5 | | 5.0 | | | |
| | TMI | 5.9 | 5.0 | 5.0 | 5.7 | 7.0 | 4.0 | | |
| | mTMDI | | | | | | | 3.9 | 3.9 |
| | EDT | | | 3.5 | | | | | |
| | ETT | 4.6 | 3.5 | | 4.0 | | 4.9 | | |
| | ETRT | | | | | 5.5 | 3.5 | | 6.9 |
| | ST | | | 4.0 | 3.3 | | | | |
| | VN | | 4.0 | | | | | | |
| | BzMA | | | | | | 2.0 | | |
| Properties | Transmittance (%) | 92 | 90 | 91 | 92 | 90 | 92 | 91 | 90 |
| | Refractive index (25° C.) | 1.596 | 1.610 | 1.622 | 1.605 | 1.636 | 1.586 | 1.603 | 1.618 |
| | Abbe number | 36 | 35 | 35 | 36 | 33 | 38 | 34 | 33 |
| | Specific gravity | 1.18 | 1.19 | 1.20 | 1.19 | 1.21 | 1.20 | 1.19 | 1.22 |
| | Impact resistance | ◯ | ◯ | ◯ | ◯ | ◯ | ◯ | ◯ | ◯ |
| | Heat resistance (° C.) | 122 | 108 | 117 | 103 | 97 | 125 | 118 | 119 |
| | Dyeing properties (%) | 28 | 21 | 30 | 23 | 31 | 25 | 30 | 33 |

TABLE 2

| Example | | 9 | 10 | 11 | 12 | 13 | 14 | 15 | 16 |
|---|---|---|---|---|---|---|---|---|---|
| Raw Material (g) | BPE-2E | 5.0 | | | | 7.0 | | 3.5 | 7.0 |
| | BPE-4E | | 5.0 | | | | 5.0 | | |
| | ABPE-4 | | | | 3.5 | | | | |
| | BPE-6E | | | 4.0 | | | | | |
| | HE-BP | | | | | | | | |
| | DVB | 6.5 | 2.5 | | 3.5 | 4.5 | 5.2 | 4.5 | 3.9 |
| | DVBP | | | 3.5 | | | | | |
| | TMI | 5.0 | 5.0 | 5.0 | 5.7 | | | | |
| | XDI | | | | | 3.2 | 3.7 | 3.3 | 2.8 |

TABLE 2-continued

| Example | | 9 | 10 | 11 | 12 | 13 | 14 | 15 | 16 |
|---|---|---|---|---|---|---|---|---|---|
| | EDT | | | 3.5 | | | | | |
| | ETT | 3.5 | 3.5 | | 4.0 | 5.3 | 6.1 | 5.4 | 6.3 |
| | ETRT | | | | | | | | |
| | ST | | | | 4.0 | 3.3 | | 3.3 | |
| | VN | | 4.0 | | | | | | |
| Properties | Transmittance (%) | 92 | 91 | 91 | 91 | 92 | 91 | 91 | 92 |
| | Refractive index (25° C.) | 1.592 | 1.612 | 1.620 | 1.606 | 1.602 | 1.616 | 1.606 | 1.618 |
| | Abbe number | 36 | 34 | 33 | 36 | 36 | 34 | 33 | 35 |
| | Specific gravity | 1.18 | 1.20 | 1.21 | 1.18 | 1.20 | 1.22 | 1.20 | 1.19 |
| | Impact resistance | ○ | ○ | ○ | ○ | ○ | ○ | ○ | ○ |
| | Heat resistance (° C.) | 120 | 102 | 114 | 105 | 116 | 105 | 113 | 105 |
| | Dyeing properties (%) | 32 | 28 | 33 | 29 | 27 | 29 | 30 | 32 |

TABLE 3

| Example | | 17 | 18 | 19 | 20 | 21 | 22 | 23 |
|---|---|---|---|---|---|---|---|---|
| Raw Material (g) | BPE-2E | 7.0 | | | 6.5 | | | 6.0 |
| | BPE-4E | | 5.0 | | | 5.0 | | |
| | BPE-6E | | | 4.5 | | | 6.0 | |
| | HE-BP | | 1.5 | | | | | 1.0 |
| | DVB | 2.5 | 2.5 | | 2.5 | 3.5 | | 2.5 |
| | DVBP | | | 3.5 | | | 4.5 | |
| | TM-2S | 10.5 | | | | | | 9.5 |
| | TM-3S | | 11.0 | 12.0 | 10.0 | | | |
| | KM-3S | | | | | 10.0 | 9.5 | |
| | ST | | | | 1.0 | 1.5 | | 1.0 |
| Properties | Transmittance (%) | 90 | 90 | 89 | 90 | 91 | 90 | 91 |
| | Refractive index (25° C.) | 1.592 | 1.605 | 1.621 | 1.595 | 1.588 | 1.602 | 1.597 |
| | Abbe number | 37 | 34 | 33 | 36 | 38 | 35 | 36 |
| | Specific gravity | 1.18 | 1.18 | 1.21 | 1.17 | 1.21 | 1.18 | 1.17 |
| | Impact resistance | ○ | ○ | ○ | ○ | ○ | ○ | ○ |
| | Heat resistance (° C.) | 120 | 105 | 112 | 102 | 95 | 114 | 108 |
| | Dyeing properties (%) | 32 | 30 | 37 | 29 | 30 | 33 | 35 |

TABLE 4

| Comp. Example | 1 | 2 | 3 | 4 | 5 | 6 | 7 | 8 | 9 |
|---|---|---|---|---|---|---|---|---|---|
| Material | ADC | PMMA | PC | Urethane resin | | | | | |
| DAAT | | | | | 14 g | | | | |
| DAIP | | | | | 6 g | | | | |

TABLE 4-continued

| Comp. Example | 1 | 2 | 3 | 4 | 5 | 6 | 7 | 8 | 9 |
|---|---|---|---|---|---|---|---|---|---|
| TMI | | | | | | 11.4 g | 9.7 g | 9.0 g | 10.6 g |
| ETT | | | | | | 8.6 g | 7.3 g | | |
| DVB | | | | | | | 3.0 g | | 4.2 g |
| PETT | | | | | | | | 11.0 g | 5.2 g |
| Transmittance (%) | 92 | 92 | 89 | 91 | 91 | Viscous liquid | Viscous liquid | Viscous liquid | Rubbery polymer which cannot be removed from a mold |
| Refractive index (25° C.) | 1.498 | 1.492 | 1.583 | 1.593 | 1.595 | | | | |
| Abbe number | 56 | 57 | 29 | 33 | 32 | | | | |
| Specific gravity | 1.32 | 1.19 | 1.26 | 1.33 | 1.27 | | | | |
| Impact resistance | ○ | ○ | ○ | ○ | X | | | | |
| Heat resistance (° C.) | 91 | 110 | 138 | 86 | 130 | | | | |
| Dyeing properties (%) | 30 | 60 | 82 | 35 | 45 | | | | |

INDUSTRIAL APPLICABILITY

As described above, according to the composition of the present invention, there can be provided a lens having high refractive index and Abbe number as well as excellent physical properties, such as specific gravity, dyeing properties, heat resistance, impact resistance and the like.

What is claimed is:

1. A monomer composition for a plastic optical material, comprising:
   a di(meth)acrylate compound;
   at least one of divinylbenzene and divinylbiphenyl;
   a crosslinking isocyanate compound;
   a dithiol compound; and
   a compound for accelerating a reaction between said isocyanate compound and said dithiol compound.

2. A monomer composition for a plastic optical material, comprising:
   a di(meth)acrylate compound;
   at least one of divinylbenzene and divinylbiphenyl; and
   a reaction product of a crosslinking isocyanate compound with a dithiol compound.

3. The monomer composition for a plastic optical material according to claim 1, wherein said di(meth)acrylate is represented by the following chemical formula (1):

$$H_2C=C(R^1)-CO-O-(CH_2CH_2O)_x-(CO)_y-Ph$$
$$H_2C=C(R^1)-CO-O-(CH_2CH_2O)_z-(CO)_y-Ph-C(CH_3)_2$$
(1)

wherein $R^1$ represents a hydrogen atom or a methyl group, Ph represents a phenylene group, x and z are each independently an integer from 1 to 5, and y is 0 or 1.

4. The monomer composition for a plastic optical material according to claim 1, wherein said accelerating compound is at least one selected from the group consisting of an amine compound, an amine salt compound and an organometallic compound.

5. A plastic optical material obtained by curing a mixture containing a monomer composition which comprises a di(meth)acrylate compound, at least one of divinylbenzene and divinylbiphenyl, a crosslinking isocyanate compound, a dithiol compound, a compound for accelerating a reaction between said isocyanate compound and said dithiol compound, and a radical polymerization initiator.

6. A plastic optical material obtained by curing a mixture containing a monomer composition which comprises a di(meth)acrylate compound, at least one of divinylbenzene and divinylbiphenyl, a reaction product of a crosslinking isocyanate compound with a dithiol compound, and a radical polymerization initiator.

7. A lens produced from the plastic optical material according to any one of claims 5 or 6.

8. The lens according to claim 7, which has a scuff-resistant coating layer on the surface thereof.

* * * * *

UNITED STATES PATENT AND TRADEMARK OFFICE
CERTIFICATE OF CORRECTION

PATENT NO.    : 6,417,273 B1                                              Page 1 of 1
DATED         : July 9, 2002
INVENTOR(S)   : Yasumi Koinuma, Katsuyoshi Tanaka, Takanori Fujita and Toshiaki Takaoka It is certified that error appears in the above-identified patent and that said Letters Patent is hereby corrected as shown below:

<u>Title page,</u>
Item [75], should read as follows:
-- [75]  Inventors: Yusumi Koinuma, Oita; Katsuyoshi Tanaka, Tokyo;
             Takanori Fujita, Oita; and Toshiaki Takaoka, Oita, all of (JP) --

Signed and Sealed this

Twenty-fourth Day of December, 2002

JAMES E. ROGAN
*Director of the United States Patent and Trademark Office*